(12) United States Patent
Schaad

(10) Patent No.: US 8,620,713 B2
(45) Date of Patent: Dec. 31, 2013

(54) MECHANISM TO CONTROL DELEGATION AND REVOCATION OF TASKS IN WORKFLOW SYSTEM

(75) Inventor: Andreas Schaad, Bad Pyrmont (DE)

(73) Assignee: SAP AG, Walldorf (DE)

( * ) Notice: Subject to any disclaimer, the term of this patent is extended or adjusted under 35 U.S.C. 154(b) by 1812 days.

(21) Appl. No.: 11/183,272

(22) Filed: Jul. 15, 2005

(65) Prior Publication Data
US 2007/0016465 A1   Jan. 18, 2007

(51) Int. Cl.
*G06Q 10/00* (2012.01)

(52) U.S. Cl.
USPC ......... 705/7.21; 705/7.26; 705/7.27; 718/100

(58) Field of Classification Search
USPC .................. 705/7.11–7.42; 718/100–108
See application file for complete search history.

(56) References Cited

U.S. PATENT DOCUMENTS

| | | | | |
|---|---|---|---|---|
| 4,658,351 A | * | 4/1987 | Teng .............................. | 718/103 |
| 4,771,375 A | * | 9/1988 | Beglin et al. ................... | 711/111 |
| 5,111,391 A | * | 5/1992 | Fields et al. ................... | 705/7.14 |
| 5,341,496 A | * | 8/1994 | Middledorp et al. ............. | 714/2 |
| 5,490,097 A | | 2/1996 | Swenson et al. | |
| 5,530,861 A | * | 6/1996 | Diamant et al. ............. | 705/7.21 |
| 5,542,088 A | * | 7/1996 | Jennings et al. .............. | 718/103 |
| 5,630,070 A | * | 5/1997 | Dietrich et al. ............... | 705/7.23 |
| 5,668,994 A | * | 9/1997 | Swagerman ................... | 718/102 |
| 5,737,727 A | * | 4/1998 | Lehmann et al. ............. | 705/7.13 |
| 5,799,297 A | | 8/1998 | Goodridge et al. | |
| 5,826,239 A | * | 10/1998 | Du et al. ....................... | 705/7.26 |
| 5,918,226 A | * | 6/1999 | Tarumi et al. ......................... | 1/1 |
| 5,950,218 A | * | 9/1999 | Howard ............................. | 711/4 |
| 5,960,404 A | * | 9/1999 | Chaar et al. ................... | 705/7.26 |
| 6,006,215 A | * | 12/1999 | Retallick ............................ | 1/1 |
| 6,026,365 A | * | 2/2000 | Hayashi ....................... | 705/7.26 |
| 6,088,679 A | | 7/2000 | Barkley | |
| 6,101,481 A | * | 8/2000 | Miller ........................... | 705/7.13 |
| 6,308,163 B1 | * | 10/2001 | Du et al. ....................... | 705/7.25 |
| 6,323,882 B1 | * | 11/2001 | Jerome et al. .................. | 715/744 |
| 6,493,731 B1 | | 12/2002 | Jones et al. | |
| 6,507,845 B1 | | 1/2003 | Cohen et al. | |
| 6,519,601 B1 | * | 2/2003 | Bosch ................................. | 1/1 |

(Continued)

FOREIGN PATENT DOCUMENTS

| WO | WO-01/33468 | 5/2001 |
|---|---|---|
| WO | WO-03017055 | 2/2003 |

OTHER PUBLICATIONS

Wainer, Jacques; Kumar, Akhil ("A Fine-grained, Controllable, User-to-User Delegation Method in RBAC", SACMAT '05, Jun. 1-3, 2005, Stockholm, Sweden. Copyright 2005 ACM 1-59593-045-0/05/0006).*

(Continued)

*Primary Examiner* — Beth V Boswell
*Assistant Examiner* — Alan S Miller
(74) *Attorney, Agent, or Firm* — Schwegman Lundberg & Woessner, P.A.

(57) ABSTRACT

A method to revoke a task includes receiving task data, the task data including information regarding a task to be performed. The method further includes receiving delegation data, the delegation data including information identifying a delegator of the task and a delegatee to perform the task. The method further includes receiving revocation task data, with the revocation task data having as its object at least aspects of the task.

13 Claims, 10 Drawing Sheets

(56) References Cited

U.S. PATENT DOCUMENTS

| | | | |
|---|---|---|---|
| 6,539,404 B1 | 3/2003 | Ouchi | |
| 6,578,006 B1* | 6/2003 | Saito et al. | 705/7.26 |
| 6,658,568 B1 | 12/2003 | Ginter et al. | |
| 6,675,261 B2 | 1/2004 | Shandony | |
| 6,678,698 B2* | 1/2004 | Fredell et al. | 707/608 |
| 6,678,716 B1* | 1/2004 | Pronsati et al. | 709/201 |
| 6,782,379 B2 | 8/2004 | Lee | |
| 6,834,354 B1* | 12/2004 | Togawa | 713/320 |
| 6,850,895 B2* | 2/2005 | Brodersen et al. | 705/7.14 |
| 6,859,523 B1 | 2/2005 | Jilk et al. | |
| 6,938,240 B2* | 8/2005 | Charisius et al. | 717/104 |
| 6,941,519 B1* | 9/2005 | Jerome et al. | 715/744 |
| 6,985,900 B2* | 1/2006 | Codd et al. | 706/56 |
| 7,007,232 B1 | 2/2006 | Ross et al. | |
| 7,013,284 B2* | 3/2006 | Guyan et al. | 705/4 |
| 7,062,449 B1* | 6/2006 | Clark | 705/7.15 |
| 7,065,493 B1* | 6/2006 | Homsi | 705/7.26 |
| 7,155,720 B2* | 12/2006 | Casati et al. | 718/104 |
| 7,210,148 B2* | 4/2007 | Arnold et al. | 719/330 |
| 7,212,986 B1* | 5/2007 | Richardson | 705/7.18 |
| 7,275,039 B2* | 9/2007 | Setteducati | 705/7.24 |
| 7,296,056 B2* | 11/2007 | Yaung | 709/205 |
| 7,406,432 B1* | 7/2008 | Motoyama | 705/7.16 |
| 7,444,216 B2* | 10/2008 | Rogers et al. | 701/31.4 |
| 7,487,115 B2* | 2/2009 | Clark | 705/7.23 |
| 2001/0032106 A1* | 10/2001 | Smith et al. | 705/7 |
| 2002/0029272 A1* | 3/2002 | Weller | 709/226 |
| 2002/0078007 A1* | 6/2002 | Herrero | 707/1 |
| 2002/0078432 A1 | 6/2002 | Charisius et al. | |
| 2002/0165753 A1* | 11/2002 | Worthington | 705/8 |
| 2003/0018512 A1* | 1/2003 | Dortmans | 705/9 |
| 2003/0023675 A1 | 1/2003 | Ouchi et al. | |
| 2003/0088534 A1* | 5/2003 | Kalantar et al. | 706/50 |
| 2003/0106039 A1* | 6/2003 | Rosnow et al. | 717/100 |
| 2003/0149714 A1* | 8/2003 | Casati et al. | 709/100 |
| 2003/0191629 A1* | 10/2003 | Yoshizawa | 704/10 |
| 2003/0227481 A1* | 12/2003 | Arend et al. | 345/762 |
| 2004/0025048 A1 | 2/2004 | Porcari et al. | |
| 2004/0030614 A1* | 2/2004 | Shields et al. | 705/26 |
| 2004/0068424 A1* | 4/2004 | Lee et al. | 705/7 |
| 2004/0073322 A1* | 4/2004 | Maenishi et al. | 700/28 |
| 2004/0103014 A1 | 5/2004 | Teegan et al. | |
| 2004/0104939 A1* | 6/2004 | Locke et al. | 345/764 |
| 2004/0133876 A1 | 7/2004 | Sproule | |
| 2004/0143811 A1 | 7/2004 | Kaelicke et al. | |
| 2004/0148213 A1 | 7/2004 | Aziz et al. | |
| 2004/0162741 A1* | 8/2004 | Flaxer et al. | 705/7 |
| 2004/0177138 A1* | 9/2004 | Salle et al. | 709/223 |
| 2005/0028073 A1* | 2/2005 | Henry et al. | 715/500 |
| 2005/0028158 A1 | 2/2005 | Ferguson et al. | |
| 2005/0033619 A1* | 2/2005 | Barnes et al. | 705/7 |
| 2005/0038707 A1 | 2/2005 | Roever et al. | |
| 2005/0038718 A1* | 2/2005 | Barnes et al. | 705/28 |
| 2005/0066328 A1* | 3/2005 | Lam | 718/100 |
| 2005/0120108 A1* | 6/2005 | Wisniewski et al. | 709/224 |
| 2005/0125274 A1* | 6/2005 | Nastacio et al. | 705/8 |
| 2005/0159968 A1* | 7/2005 | Cozzolino | 705/1 |
| 2006/0095582 A1* | 5/2006 | Nitya et al. | 709/236 |
| 2006/0107265 A1* | 5/2006 | Schulz et al. | 718/100 |
| 2006/0136495 A1 | 6/2006 | Schaad | |
| 2006/0259573 A1* | 11/2006 | Goodman et al. | 709/217 |

OTHER PUBLICATIONS

Eder, Johann; Liebhart, Walter ("The Workflow Activity Model WAMO", Proceedings of the 3rd Int. Conference on Cooperative Information Systems (CoopIS), 1995).*

Adam, Nabil R.; Atluri, Vijayalakshmi; Huang, Wei-Kuang ("Modeling and Analysis of Workflows Using Petri Nets", Journal of Intelligent Information Systems, 10, 131-158 (1998) © 1998 Kluwer Academic Publishers, Boston. Manufactured in The Netherlands).*

ZurMuehlen, Michael ("Organizational Management in Workflow Applications—Issues and Perspectives", Information Technology and Management 5, 271-291, 2004 © 2004 Kluwer Academic Publishers. Manufactured in The Netherlands).*

Georgakopoulos, Dimitrios; Hornick, Mark ("An Overview of Workflow Management: From Process Modeling to Workflow Automation Infrastructure", Distributed and Parallel Databases, 3, 119-153 (1995), © 1995 Kluwer Academic Publishers, Boston. Manufactured in the Netherlands).*

Wainer, Jacques; Kumar, Akhil; Barthelmess, Paulo ("Security Management in the presence of delegation and revocation in workflow systems" Istituto de Coputacao, Techinical Report, IC-01-014, Oct. 2001).*

Wainer, Jacques; Kumar, Akhil; Barthelmess, Paulo ("W-RBAC a Workflow Security Model Incorporating Controlled Overriding of Constraints" International Journal of Cooperative Information Systems vol. 12, No. 4 (2003) 455-485, © World Scientific Publishing Company).*

Payne, Stephen J.; Green, T. R. G.; ("Task-Action Grammars: A Model of the Mental Representation of Task Languages", Human-Computer Interaction, 1986, vol. 2, pp. 93-133 Copyright @ 1986, Lawrence Erlbaum Associates, Inc.).*

Bertino, Elisa, Ferrari, Elena ("The Specification and Enforcement of Authorization Constraints in Workflow Management Systems" ACM Transactions on Information and System Security, vol. 2, No. 1, Feb. 1999, pp. 65-104. © 1999 ACM 1094-9224/99/0200-0065).*

"BEA WebLogic Process Integrator Overview 2.0", e-docs.bea.com, http://e-docs.bea.com/wlintegration/v2_0/processintegrator/studio/ch1.htm#1216782,(2001),11 pgs.

"Monitoring Workflows BEA WebLogic Integration Release 2.1", e-docs.bea.com, http://e-docs.bea.com/wlintegration/v2_1/studio/ch10.htm#1220539,(2001), 19 pgs.

"Workshop Program, Position Papers, Invited Presentations", *Workshop on Policies for Distributed Systems and Networks*, (Jan. 2001).

Barka, Ezedin, et al., "Framework for Role-Based Delegation Models", *Proceedings of the 16th Annual Computer Security Applications Conference*, (2000),8 pgs.

Bertino, E, et al., "An extended authorization model for relational databases", *IEEE Transactions on Knowledge and Data Engineering*, 9(1), (Jan.-Feb. 1997),85-101.

Crispo, B, "Delegation of Responsibilities", *from Security Protocols*, Position paper,(1998),118-124.

Damianou, Nicodemos, et al., "Ponder: A Language for Specifying Security and Management Policies for Distributed Systems", *The Language Specification, Verision 2.1, Imperial College Research DoC 2000/1*, http://www-dse.doc.ic.ac.uk/policies,(Apr. 3, 2000),42 pgs.

Damianou, Nicodemos, et al., "The Ponder Policy Specification Language", *Proc. Policy 2001: Workshop on Policies for Distributed Systems and Networks. 2001*. Bristol, UK., (Jan. 2001),21 pgs.

Fakas, et al., "A peer to peer architecture for dynamic workflow management", *Information and Software Technology 46*, Document available at: http://www.docm.mmu.ac.uk/STAFF/G.Fakas/p2pwfist-fakas-bill.pdf,(2004),423-31.

Georgakopoulos, Diimitrios, et al., "An Overview of Workflow Management: From Process Modeling to Workflow Automation Infrastructure", *Distributed and Parallel Databases, 3, 119-153* (1995) Kluwer Academic Publishers, Boston Manufactured in the Netherlands, (1995),34 pgs.

Jackson, Daniel, et al., "A Micromodularity Mechanism", *Joint 8th European Software Engineering Conference (ESEC) and 9th ACM SIGSOFT Symposium on the Foundations of Software Engineering (FSE-9)*, Vienna, Austria, (Sep. 10-14, 2001),14 pgs.

Joeris, G, et al., "Workflow Support for Inter-Organizational Engineering and Production Processes", *In International Journal of Agile Engineering*, Special Issue on Information Management for Productivity Enhancement,(2000),15 pgs.

Kern, Axel, et al., "An administration concept for the enterprise role-based access control model", *Proceedings of the eighth ACM symposium on Access control models and technologies*, (2003),9 pgs.

Minsky, Naftaly H., et al., "Law-Governed Interaction: a Coordination and Control Mechanism for Heterogeneous Distributed Systems", *ACM TOSEM*, 9(3), (2000),31 pgs.

(56) References Cited

OTHER PUBLICATIONS

Moffett, Jonathan D., "Delegation of Authority Using Domain-Based Access Rules", *A thesis submitted in partial fulfilment of the requirements for the degree of Doctor of Philosophy of the University of London, and the Diploma of Imperial College of Science, Technology & Medicine*, (Jul. 1990, Corrected Sep. 1990),55-77.

Mullins, J , "Delegation and Management", *British Journal of Administrative Management*, 31(7), (1981),218-224.

Schaad, Andreas , "A Framework for Organisational Control Principles", *Chapters 7 & 8 of the Paper submitted for Doctor of Philosophy—University of York*, (Jul. 2003),115-172.

Schaad, Andreas , et al., "A Framework for Organisational Control Principles", *Proceedings of the 18th Annual Computer Security Applications Conference*, (2002),10 pgs.

Schaad, Andreas , et al., "An Extended Analysis of Delegating Obligations", *SAP Labs France*, Submission paper,(Jul. 2004),15 pgs.

Schaad, Andreas , et al., "Delegation of Obligations", *IEEE Policies for Distributed Systems and Networks (POLICY 2002)*, (Jun. 5-7, 2002),11 pgs.

Schaad, Andreas , et al., "Separation, review and supervision controls in the context of a credit application process: a case study of organisational control principles", *Proceedings of the 2004 ACM symposium on Applied computing*, (2004),1380-1384.

Schaad, Andreas, et al., "The Incorporation of Control Principles into Access Control Policies", *Policy 2001: Workshop on Policies for Distributed Systems & Networks*, Bristol UK, (2001),4 pgs.

Schaad, Andreas, et al., "The role-based access control system of a European bank: a case study and discussion", *Proceedings of the sixth ACM symposium on Access control models and technologies*, (2000),15 pgs.

Schaad, "The Why and How of Delegations in Distributed Security Systems", Paper,(No Date Listed),15 pgs.

Schawartz, D , "A loosely coupled peer to peer workflow system", *Masters Thesis, Technical University of Vienna*, Complete document available at: http://www.infosys.tuwein.ac.at/Staff/sd/DA/DanielSchwartz.pdf,(May 13, 2004),7 extracted pgs.

Vogt, Gerald, "Delegation of Tasks and Rights", *12th International Workshop on Distributed Systems: Operations and Management*, (Oct. 15-17, 2001),11 pgs.

Yao, Walt , et al., "A Model of OASIS Role-Based Access Control and its Support for Active Security", *SACMAT-01*, Chantilly, Virginia, USA., (May 3-4, 2001),171-181.

Zhang, Longhua , et al., "A Rule-Based Framework for Role-Bases Delegation and Revocation", *ACM Transactions on Information and System Security*, vol. 6, No. 3, (Aug. 2003),404-441.

Pugh, Derek S., "(BOOK)—Organization theory : selected readings /", Harmondsworth, Middlesex : *Penguin Books*, 4th Edition,(1997).

Sandhu, R. S., "Role-based Access Control Models", *IEEE Computer*, 29(2), (Feb. 1996), 34-44.

"U.S. Appl. No. 11/016,026, Non Final Office Action mailed Apr. 14, 2009", 23 pgs.

"U.S. Appl. No. 11/016,026, Response filed Jul. 1, 2009 to Non Final Office Action mailed Apr. 14, 2009", 15 pgs.

"U.S. Appl. No. 11/016,026, Notice of Allowance mailed Nov. 5, 2009", 14 Pgs.

"U.S. Appl. No. 11/016,026 Notice of Allowance mailed Jul. 7, 2010", 8 pgs.

* cited by examiner

MECHANISM TO CONTROL DELEGATION AND REVOCATION OF TASKS IN WORKFLOW SYSTEM

FIELD

This application relates to a method and system to revoke a task in application programs, and to a machine-readable medium comprising instructions to perform this method.

BACKGROUND

Tasks or obligations in an application program environment typically depend on the specific application domain. Tasks or obligations may, for example, be the updating of a file in a database, entering a customer's details in the context of opening an account, approving or rejecting a credit application, or opening a legal case.

In the paper-based world, tasks are continuously created, delegated or discharged according to the overall goals of an organisation and the general principles governing the distribution of work within an organisation. These principles would typically comprise a framework for maintaining control over the supervision and responsibility of task completion.

Although workflow products (e.g., the SAP Webflow product), and non-workflow products (e.g., Outlook) support the delegation of tasks, the available delegation functionalities of these application programs are rudimentary. This lack of sophistication often results in uncertainty as to the person responsible for currently performing a task, the origin and ownership of the initial task and the delegation sequence of the task. It may further be difficult for a principal who delegated a task to find out whether a task has, in fact, been completed. Also, the present delegation functionalities provided by application programs may not provide the information required to identify the person who is ultimately responsible to ensure that each single operation in a task has been performed, and may not provide a system-enabled mechanism to handle a situation if each single operation in a task has not been performed.

SUMMARY

According to an aspect of the invention there is provided a method to revoke a task. The method includes receiving task data, the task data including information regarding a task to be performed. The method further includes receiving delegation data, the delegation data including information identifying a delegator of the task and a delegatee to perform the task. The method further includes receiving revocation task data, with the revocation task data having as its object at least aspects of the task.

Other features will be apparent from the accompanying drawings and from the detailed description that follows.

DESCRIPTION OF DRAWINGS

An example embodiment of the present invention is illustrated by way of example and not limitation in the figures of the accompanying drawings, in which like references indicate similar elements and in which.

DETAILED DESCRIPTION

According to an aspect of the invention there is provided a method to revoke a task. The method includes receiving task data, the task data including information regarding a task to be performed. The method further includes receiving delegation data, the delegation data including information identifying a delegator of the task and a delegatee to perform the task. The method further includes receiving revocation task data, with the revocation task data having as its object at least aspects of the task.

"Task" as used herein may include a step, an obligation, an activity and/or an action to be performed. The definition of task may depend on the specific application domain.

In the following detailed description of the example embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

An example embodiment of the present invention is described below with reference to Use Case and Data models, as well as flow diagrams. The data structure of a task created by an example method is described with reference to a block diagram, followed by a sequence diagram showing the interaction between a delegator, delegatee, data models and other modules of the system of an example embodiment of the present invention. A system diagram of an example embodiment of the present invention is described. Lastly, machine for implementing the method is described in detail.

Figure 1A:
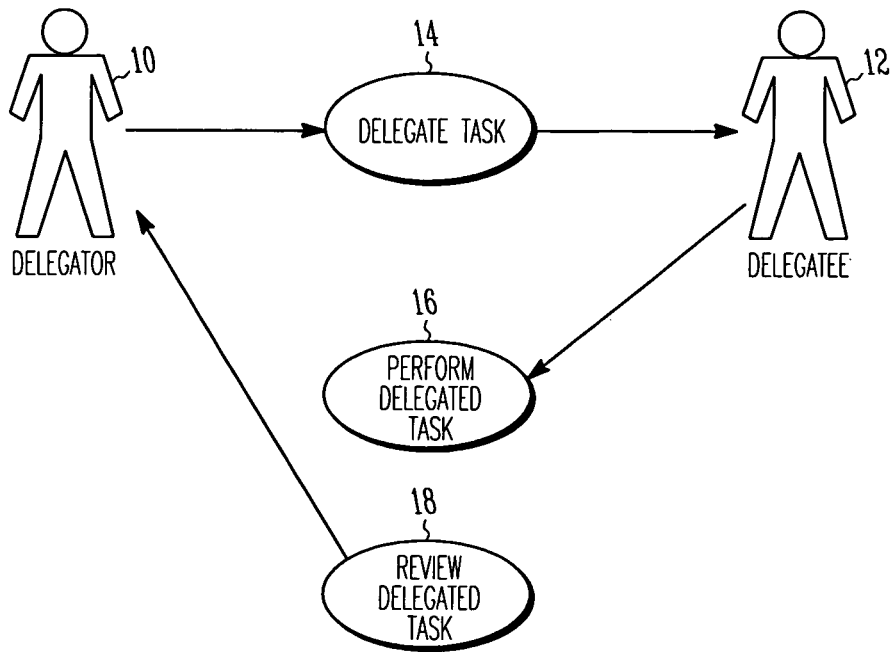
FIG. 1A is a diagrammatic representation of a Use Case model of the relationship between a delegator, a delegatee and a delegated task, according to an example embodiment of the present invention.

FIG. 1A is a diagrammatic representation of a Use Case model of the relationship between a delegator 10, a delegatee 12 and a delegated task 14, according to an example embodiment of the present invention. In an application program, whether workflow based (e.g., SAP Webflow) or non-workflow based (e.g., Outlook), the delegator may be responsible for the completion of a task. The delegator may however choose to delegate this task, now the delegated task 14, to the delegatee 12. Such delegation may be prompted by circumstances such as workload or efficiency.

After delegation, the delegatee 12 takes over the responsibility for performing the delegated task (shown by 16), while the delegator 10 may remain responsible for reviewing the performed or completed delegated task (shown by 18) or at least aspects thereof. This review of the task takes the form of a review task that is created by a review module, according to an example embodiment of the invention and described below. The review task is performed on evidence that is created on the completion of the task and this evidence therefore forms the basis of the review task.

An example implementation of the invention is in the context of a bookkeeping department. An accountant, the delegator, may not be able to process some current invoices from suppliers and decides to delegate the processing of invoices with a smaller value, i.e. the task, to a junior accountant, the delegatee. The junior accountant now is to perform the delegated task and the senior accountant is to review the task that was initially delegated. This review task may take the form of checking that supplier invoices have been entered into the accounting system. Continuing the example, the evidence that is associated with the review task and that may be presented to the senior accountant as evidence that the delegated task has been completed, may comprise an entry for the invoice amount within a general ledger.

Similarly, an example context may be a loan application in a bank. In this example, a "four-eye" principle includes a clerk delegating one or more tasks in a loan application workflow to his colleague. The colleague performs the delegated task, but the first clerk being the delegator or delegating principal still may be under obligation to review the completed task. In this example, the evidence associated with the review task may be the absence of exceptions reported by a control of the loan processing application.

Figure 1B:
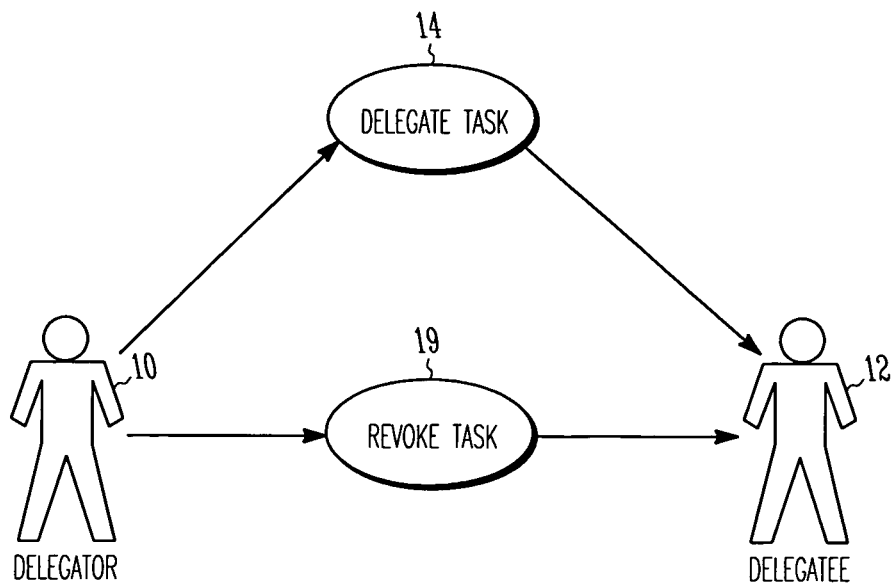
FIG. 1B is a diagrammatic representation of a Use Case model of the relationship between a delegator, a delegatee and a revoked task, according to an example embodiment of the present invention.

FIG. 1B is a diagrammatic representation of a Use Case model of the relationship between the delegator 10, the delegatee 12 and a revoked task 19, according to an example embodiment of the present invention. The task may be revoked before the delegate 12 performs the task 16, as shown in FIG. 1A, and as described in more detail herein. The revoke task 19 may be executed by the delegator 10 in some embodiments. Alternatively, or additionally, any specified principal may execute the revoke task 19.

An example implementation of the invention follows the above bookkeeping department example. The senior accountant or delegator may have some free time available and may want to perform the task himself/herself Alternatively, the senior accountant or delegator may want to delegate the task to another principal other than the delegatee 12. Further, the delegator may want to revoke the task from the delegatee 12 in instances where the delegatee 12 has an illness and/or an absence, in order to allow for continuation of work.

Similarly, an example context may be an incoming customer query received by consultant A. Resolving the query takes certain technical knowledge. Consultant A may not possess such certain technical knowledge. Consultant A may delegate the task of resolving the query to consultant B. In the instance where consultant B is unable to resolve the query, consultant A may revoke the task to facilitate resolution and distribution of the task.

Figure 2A:
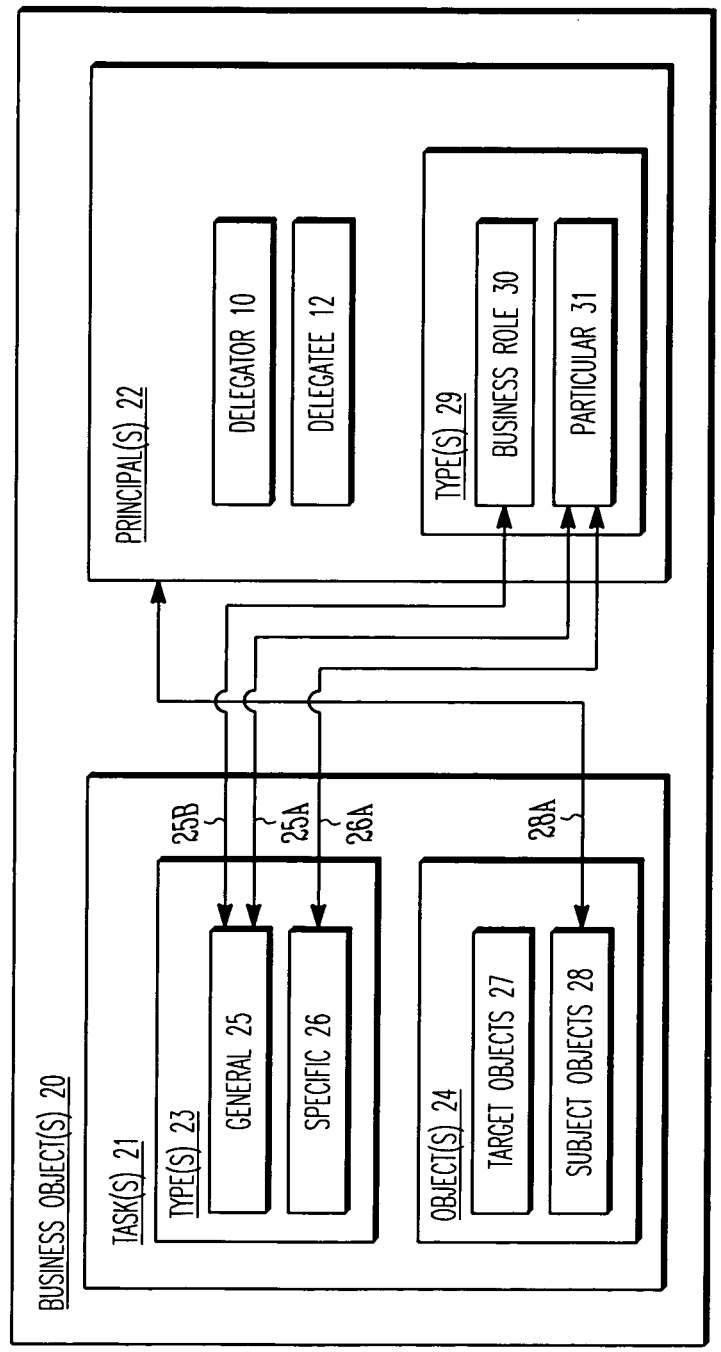
FIG. 2A is a diagrammatic representation of a business object, as used in an example embodiment of the present invention.
Figure 2B:
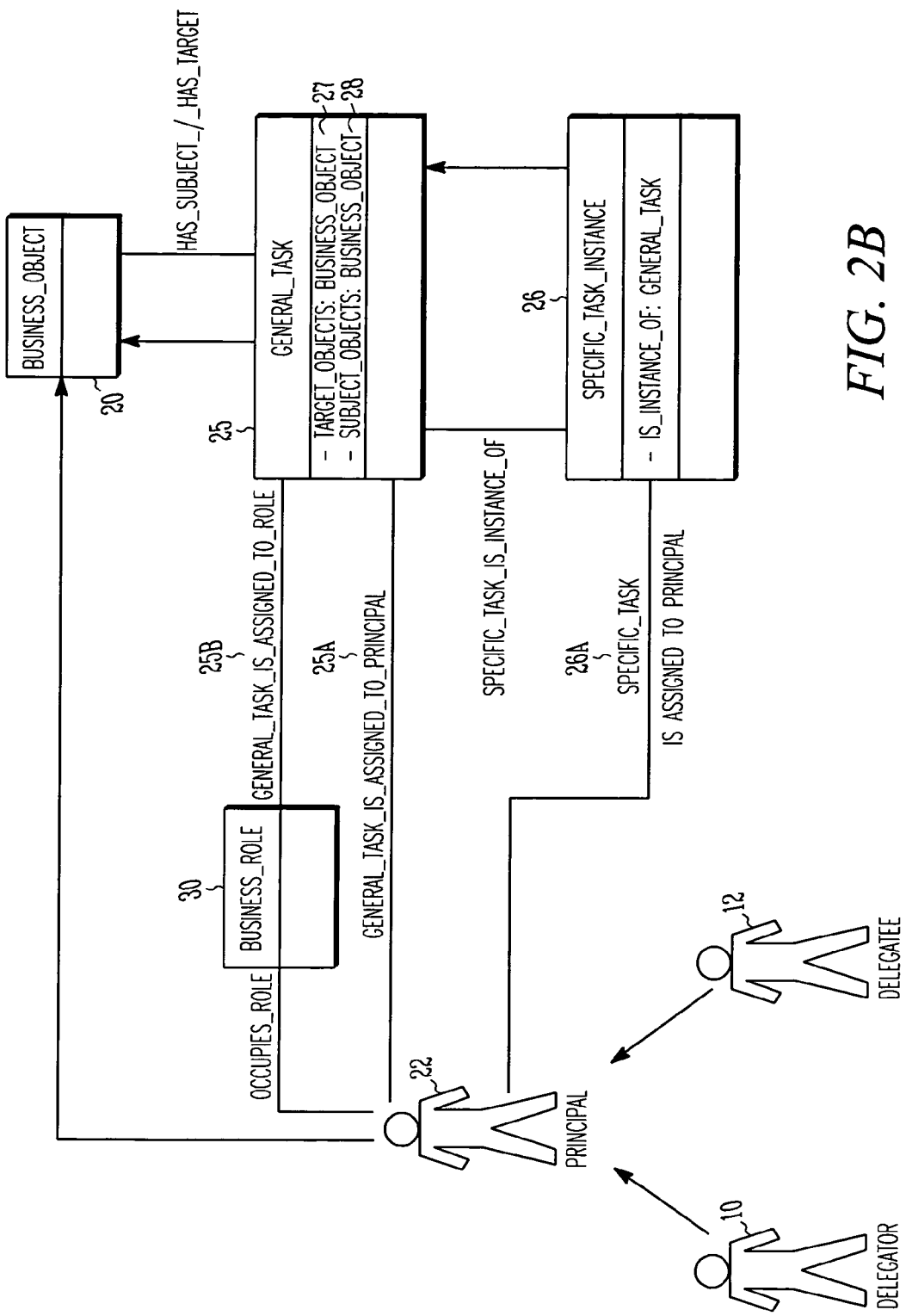
FIG. 2B is a diagrammatic representation of a Data model defining business objects, principals in an application program, as well as a structure of a task, as used in an example embodiment of the present invention.

FIG. 2A is a diagrammatic representation of a business object as used in an example embodiment of the present invention. FIG. 2B is a diagrammatic representation of a Data model defining business objects, principals in an application program, as well as a structure of a task, as used in an example embodiment of the present invention. Business objects 20 may include a general set of resources of a company. Business objects 20 may include a principal 22 (e.g. delegators 10 and delegatees 12), as well as the task 21 a principal 22 is to perform.

Each task 21 may include a general task 25. In an additional embodiment, a task 21 may comprise the general task 25 including the specific task 26, and/or including more than one specific task 26, such that the specific task may be an instance of the general task 25. There may be any number of specific tasks associated to one general task. However, in this embodiment, specific tasks are associated to exactly one general task. Such specific task instances are of the same type as the corresponding general task. An example may include the general task to process invoices, while two specific tasks of the same type of general task may include processing an invoice by Accountant A for customer x, and processing an invoice by Accountant A for customer y.

As shown in FIGS. 2A and 2B, specific task instances 26 are of the type general task 25, and the general task 25 is of the type business object 20. Similarly, the delegator 10 and delegatee 12 are of the type principal 22 and the principal 22 is of the type business object 20. The black arrowheads of FIG. 2B indicate an inheritance relationship as found in the object-oriented modeling domain.

Each task 21 may include an application program that may be defined by two objects 24 or two general attributes:

Target object 27: the business object (or resource, e.g., an account) that a set of actions defined in the task are to be performed on.

Subject object 28: the business object (e.g., principal) that has to perform the task. The connection between the subject object(s) 28 and the principal 22 is depicted in the illustration of FIG. 2A at line 28A.

According to these attributes, the subject and target information of the task therefore may define who should perform the task and also may define what resource the task is to be performed on. In the above example, the invoice is the target object, and the accountant A is the subject object.

There may be two types 29 of principals 22: a business role principal 30 and a particular principal 31. Principals may be a target object 27 of a task or a subject object 28 of a task. Possible assignments of the task types to the principal types are depicted in lines 25A, 25B, and 26A. The general task 25 may be assigned to the particular principal 31 directly (shown by line 25A of FIG. 2A) or may be assigned to a principal over the business role 30 the principal occupies (shown by line 25B). The specific task 26 or instance may be assigned to the particular principal 31 directly (shown by line 26A). In some instances, specific tasks may be delegated to exactly one principal as its subject object, and may not be delegated to a principal over a business role, i.e. specific tasks may not be shared among principals.

Besides the delegated task or assigned task described above, the review task 18 and the revoke task 19 may each also have the two attributes, e.g., the target object and the subject object. The review task 18 may have the subject object 28 as the delegator (to review the task) and the target object 27 as the delegated task (the task to be reviewed). The delegated task may have the subject object 28 as the delegate 12 (to perform the task) and the target object 27 as the task, general or specific (the task to be performed). As shown in more detail with regard to FIG. 5, the revoke task 19 may have the subject object 28 as the delegator (to revoke the task) and the target object 27 as the delegated task (the task to be revoked). The delegated task may have the subject object 28 as the delegate 12 (to perform the task) and the target object 27 as the task, general or specific (the task to be performed).

In FIG. 2B, the general task, relating to the business object 20, is associated with and may include a subject object and a target object. There may be any number of subject objects for any general task. Various business objects 20 may form the target object and the subject object of a task.

Figure 3:
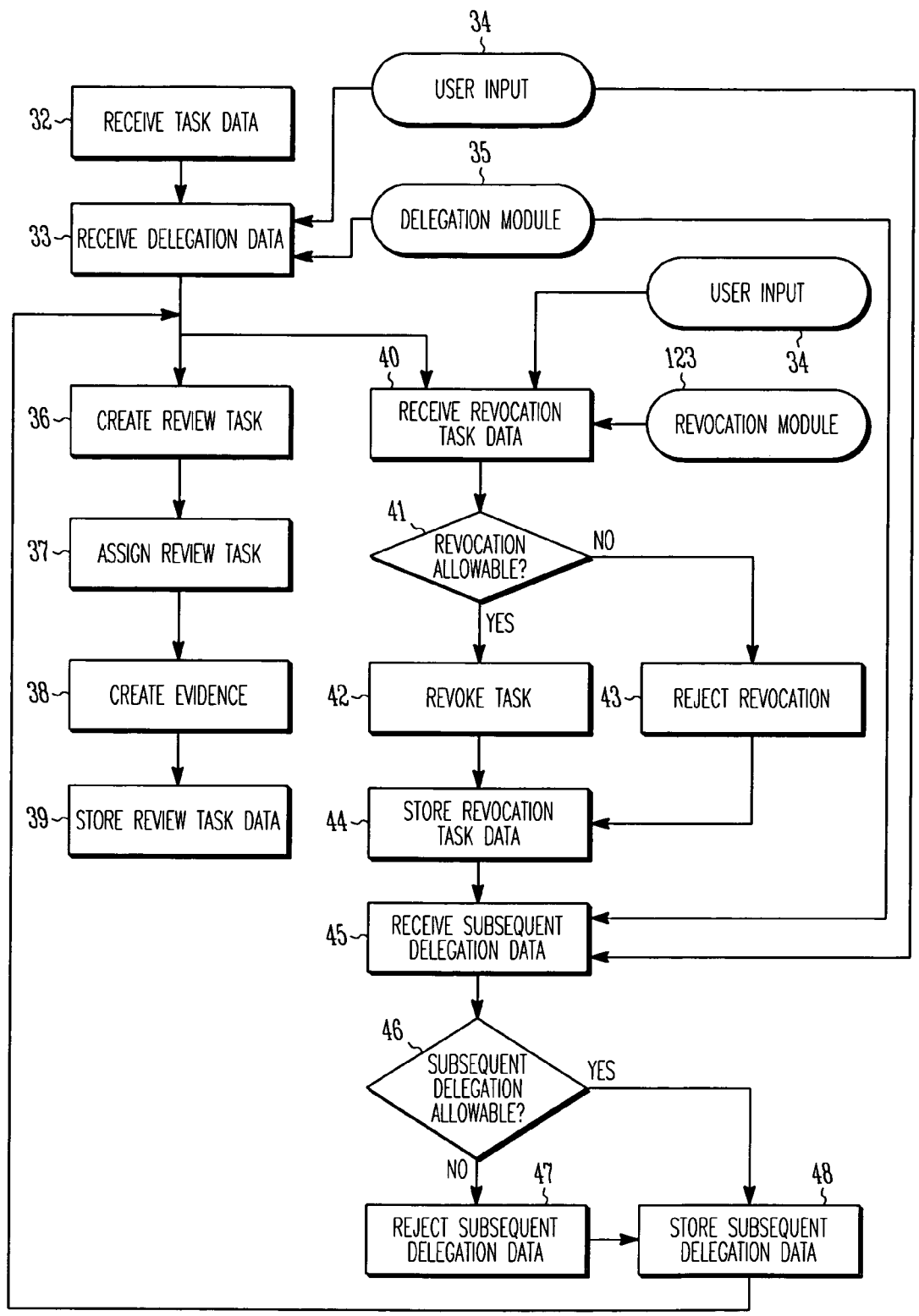
FIG. 3 is a general flow diagram of a method used in delegating, reviewing, and/or revoking a task, according to an example embodiment of the present invention.

FIG. 3 is a general flow diagram of a method used in reviewing and/or revoking a task according to an example embodiment of the present invention. In an application program, task data, defining a task to be performed, is received in operation 32. This data may be typically entered by a principal via a user interface. Data that may be entered with regard to tasks is described in more detail with regard to FIG. 6.

Delegation data is received in operation 33, either via a user interface 34 or via a delegation module 35 and database. The delegation module 35 may include data from a delegation module data (delegation data) 104, as indicated in the data structure of FIG. 6, which includes information identifying a delegator and a delegatee of the task. It will be appreciated that, in the context of the example, the creator of the task may be the delegator.

For example, where a principal decides that a task should be performed by another principal or delegatee, the principal or delegator delegates the task to a delegatee by entering the relevant information via the user interface. This may be an ad hoc delegation. Alternatively, the delegation module 35 may obtain delegation module data 104 from the database 100, where a particular rule determines that a task should automatically be delegated to a delegatee. An example of such a rule is where a delegator is out of the office and has activated an out of office rule, such that any incoming tasks are automatically delegated. Such an automatic delegation rule ensures that the task is completed without delay, without having to wait for an input from a delegator. It will be appreciated that the delegation module 35 may find particular application in application programs based on workflow.

Figure 6:
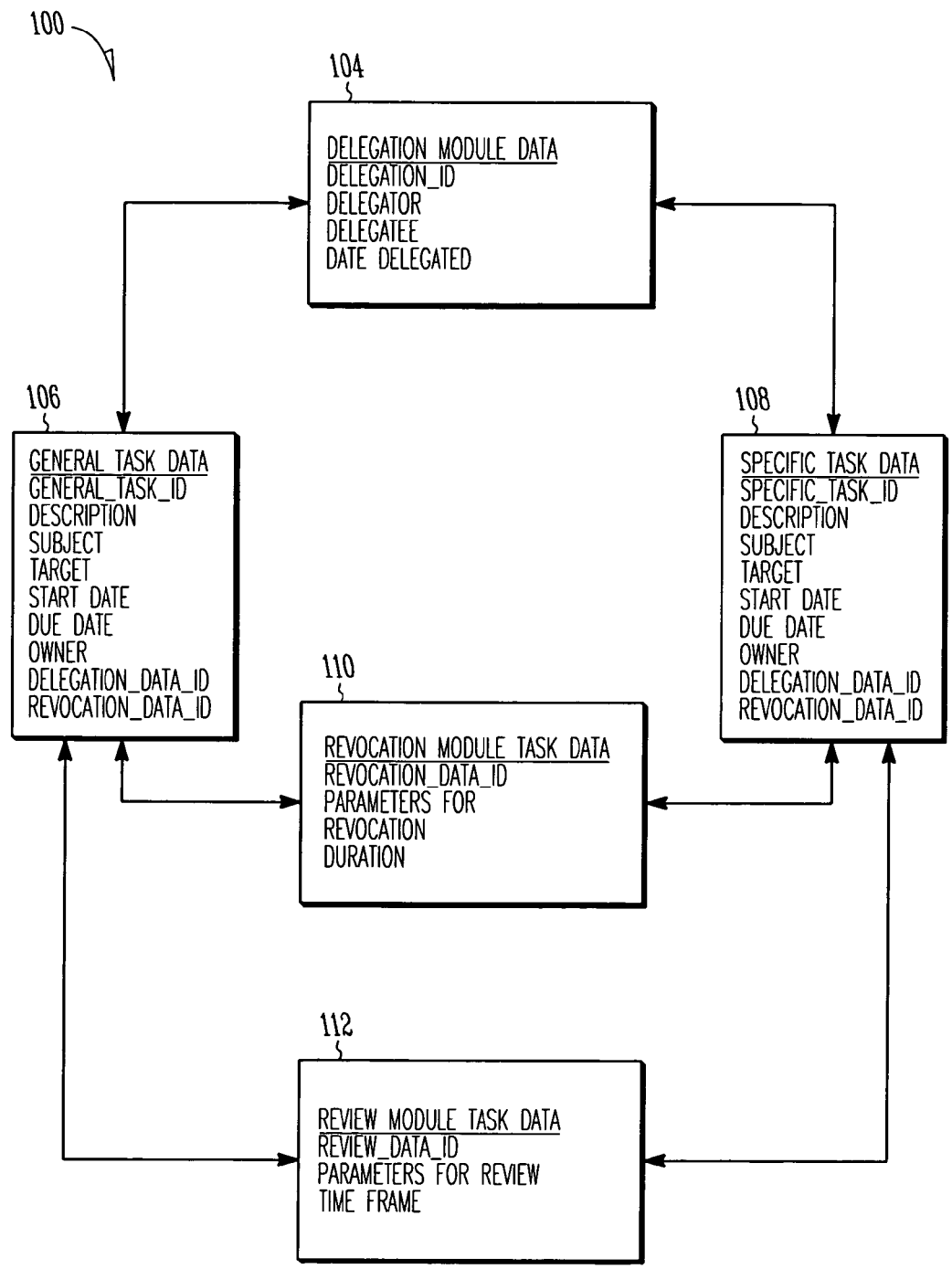
FIG. 6 is a block diagram showing the data structure for task data, delegation module data, revocation module task data, and review module task data, as used in an example embodiment of the present invention.

The flow chart of FIG. 3 may branch to operation 36 and/or operation 40 upon receipt of the delegation data at operation 33. The revocation task data may be operated at any time after operation 33 (receive delegation data) and before the task is completed at operation 33 (create evidence). A review task is created in operation 36, with the review task being assigned in operation 37. The review task may be assigned to the delegator to ensure that the delegator retains responsibility for the effective completion of the task delegated. Review module task data (Review data) 112 of FIG. 6 is created on the creation of the review task operation 36 and includes, as shown in and described with respect to FIG. 6, review identification information, which is also stored under the task data to directly link the particular review task with the task.

Once the delegatee has performed the task, evidence is created (shown in operation 38) as confirmation that the task has been completed. The evidence is directly related to the task, and is typically defined by the review data on creation of the review task. The evidence is now presented to the delegator to enable the delegator to perform the review task. Once the review task has been performed, data on this completed review task is stored in operation 39. This data may typically include information on the created evidence and the completed task.

Additionally or alternatively, at a time after the delegation data is received at operation 33, the revocation task data may be received at operation 40. At operation 41, a query as to whether the revocation is allowable is performed. The query includes the method described in detail with regard to FIG. 4. Revocation module task data (revocation task data) 110 may be received in operation 40 via a revocation module 123, as indicated in the data structure of FIG. 7.

After verification that the task may be revoked, the task is revoked at operation 42. If revocation is not allowable, the revocation is rejected at operation 43. Data relating to the revocation task is stored in the database in operation 44.

Additionally or alternatively, the delegated task may be manually assigned via the user input 34 or automatically assigned to a subsequent delegatee by the delegation module 35 and subsequent delegation data may be received at operation 45. The delegation module 35 may obtain information from the database 100 to define the subsequent delegator and subsequent delegatee. As described above, the user input is used where a delegator decides that the task should be performed by another person or delegatee. The delegator then creates a delegation path to the delegatee by the user interface. Alternatively, the application program may make use of the delegation module 35, which receives the delegation (module) data 104 from the database 100 when particular circumstances exist.

At operation 46, the subsequent delegation data may be compared to a set of rules (within database 100 on FIG. 8) to determine whether the delegation is allowable.

For example, the set of rules may include a limitation on the number of subsequent delegations which is allowable. Specifically, certain important tasks may only be delegated once, while other smaller tasks may be delegated three times, for instance. The set of rules may also specify that a review task can never be delegated and should therefore be completed by the respective delegator. In a further embodiment, the set of rules may disqualify the delegator or subsequent delegators from being subsequent delegatees. It is foreseen that other rules may restrict the delegation of tasks within a time period prior to the deadline of completing the task. As further examples, rules may specify that a clerk may only delegate within his branch, or that a senior sales representative may only delegate to staff in his sales region. Other rules may include a limit to the number of times a task may be delegated (depth of delegation chain), and a limit on cycles in the delegation chain, e.g., a task not to come back to the initially delegating principal.

Should the subsequent delegation data that is received not be allowable according to the set of rules, the delegation of the task will be rejected in operation 47 and subsequent delegation data is stored at operation 48. The responsibility of completing the delegated task may then be returned to the original delegatee or to the original delegator (not shown).

In the event that the subsequent delegation is allowable according to the set of rules, subsequent delegation data is stored at operation 48 and the process returns to the review task created at operation 36.

Figure 4:
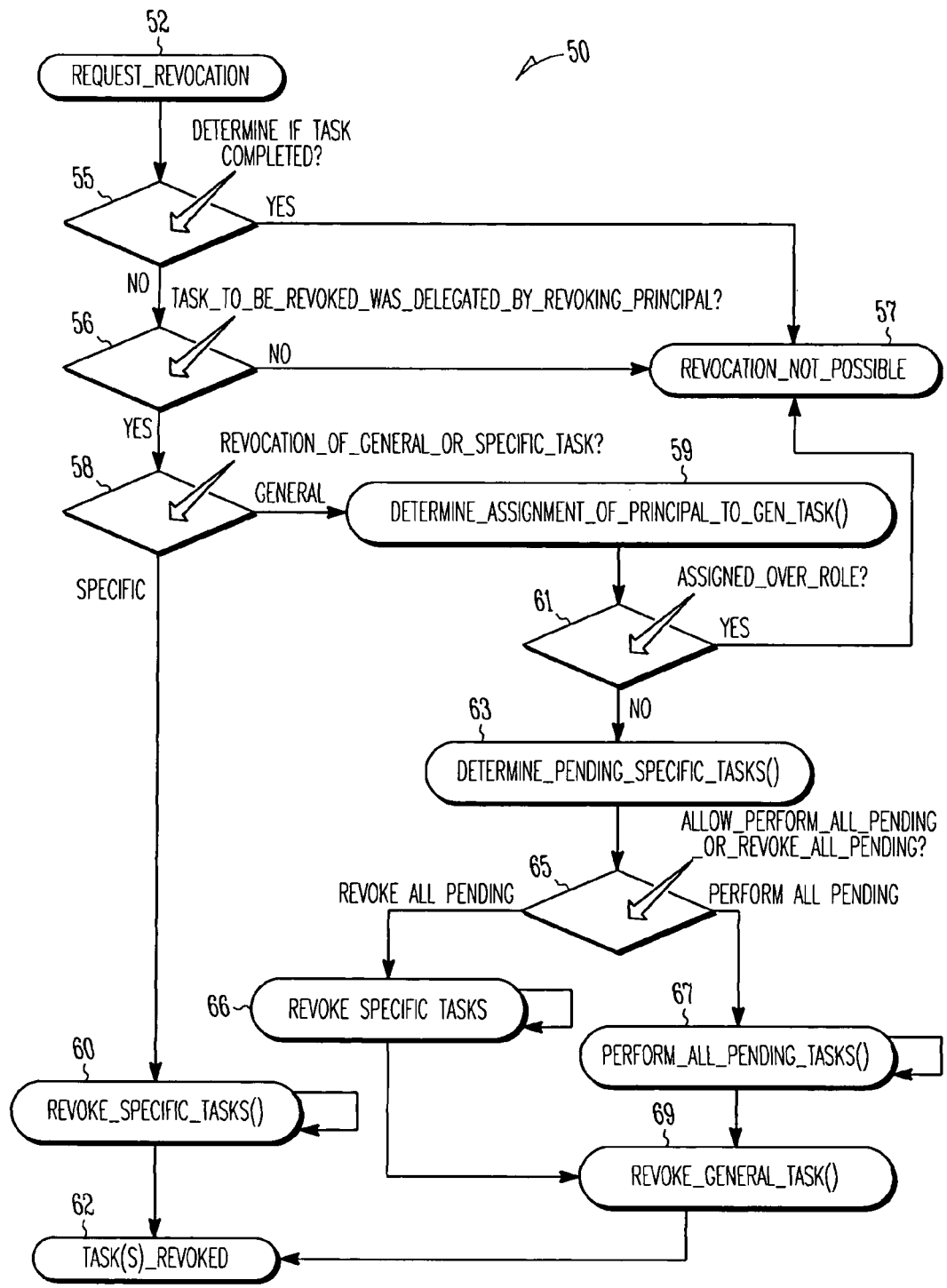
FIG. 4 is a flow diagram of a method to revoke a task according to an example embodiment of the present invention.

FIG. 4 is a flow diagram of a method 50 to revoke a task according to an example embodiment of the present invention. At operation 52, the revocation of the task is requested. At operation 55, a determination as to whether the task is completed is made. If the task is completed, revocation is not possible at operation 57. If the task is not completed, a determination as to whether the task is to be revoked by the same principal that delegated the task is made at operation 56. If the revoking principal is not the same as the initial delegator, revocation is not possible at operation 57 in this embodiment. If the revoking principal is the same as the delegator, a determination as to whether the task to be revoked is general or specific is made at operation 58.

If the task is specific, the specific task(s) are revoked at operation 60 and at operation 62. The return arrow at operation 60 (and subsequent operations) represents a repeating loop to revoke (or perform) each instance of a task (or each specific task) as part of the revocation process.

If the task is general, a determination is made as to whether assignment of the task was to a principal or over a role at operation 59 and at operation 61. A principal type associated with the delegate may be determined, wherein the principal type is selected from a group including a business role principal and a particular principal. If the general task was assigned over a role, revocation is not possible at operation 57. The general task cannot be removed from the business role as this may have an effect on all other role occupants. For example, a general "invoice processing" task is removed from an entire role. The effect includes the entire role being unable to process invoices.

If the general task was assigned to a principal directly, a determination is made at operation 63 as to whether there are any pending or "existing" specific tasks. Assuming there are pending specific tasks of the general task, e.g., at least some of the specific tasks are not yet completed (as previously determined at operation 55), the process is forwarded to operation 65.

At operation 65, a determination is made as to whether all pending tasks are allowed to be performed or whether all pending tasks are to be revoked individually before the final revocation of the general task. A disposition of pending specific tasks is made, wherein the disposition is selected from a group including revocation and performance completion. If all pending tasks are to be revoked, each specific pending task is revoked in the loop at operation 66, and the general task is then revoked at operation 69.

If all pending tasks are to be performed, each specific pending task is performed in the loop at operation 67, and the general task is then revoked at operation 69.

In an example, a principal is transferred to a different accounting division. The principal has a change in roles. However, transfer is only complete after he performs all the currently pending tasks instances. Instances may be pending from the moment they are created and/or from the moment a principal has started the task.

The process ends at operation 62 where the task is revoked.

Revoking generally may be initiated by a principal responsible for task completion. In contrast, task reassignment generally may be initiated by an administrator.

Figure 5:
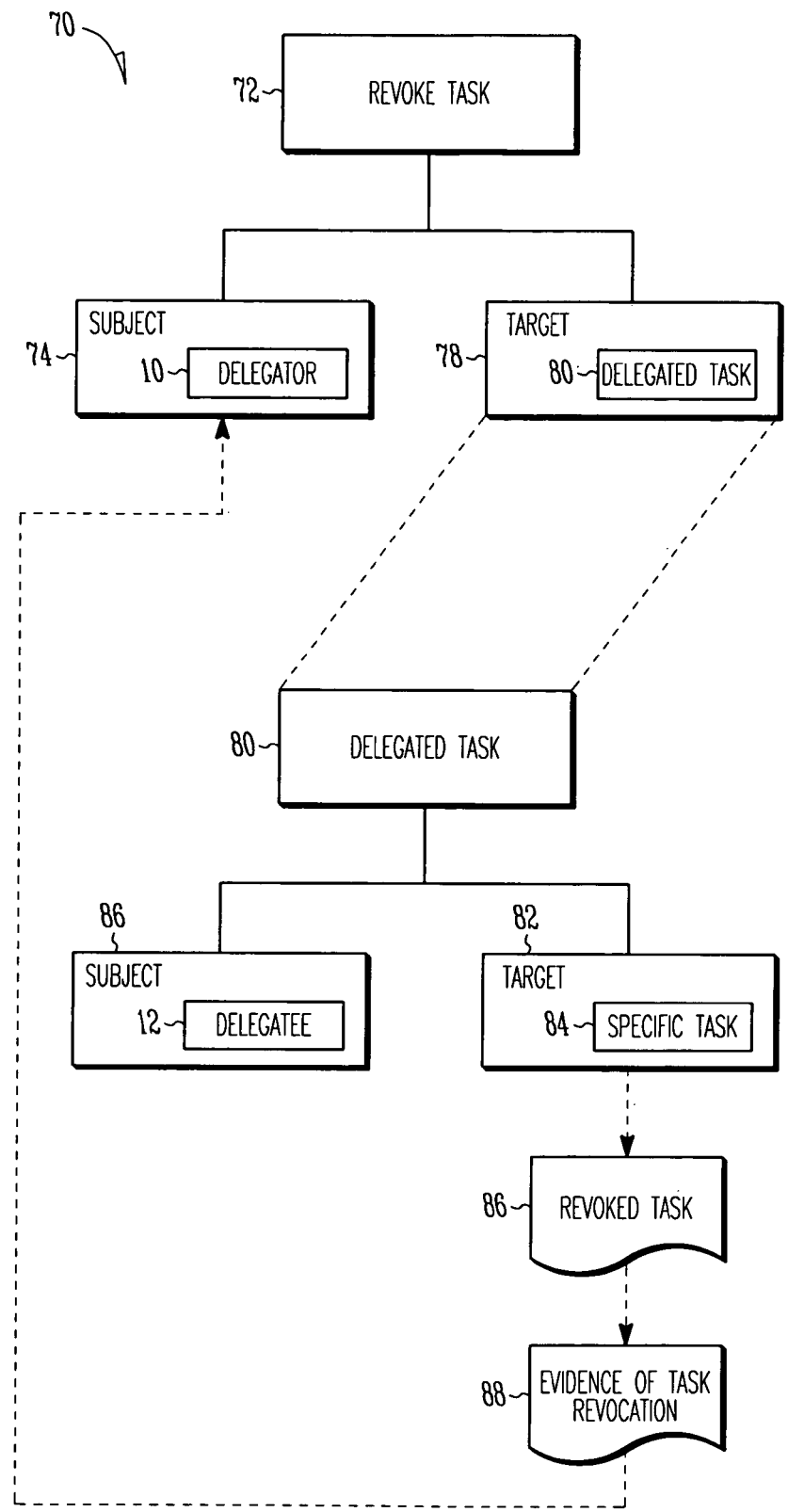
FIG. 5 is a block diagram showing the structure of a task according to an embodiment of the present invention.

FIG. 5 is a diagrammatic representation 70 of a structure of a task created according to an example embodiment of the present invention. The target 78 of the revoke task 72 is the delegated task 80 (e.g., the original task that has been delegated). As discussed, this means that the revocation task 72 is to be performed with respect to the delegated task 80, or with respect to at least aspects of the delegated task 80. The revoke task 72 has as its subject 74 the delegator 10, which means that the delegator 10 is the business object or principal who performs the revoke task 80.

Taking a step back, the delegated task 80 has as its target 78 the original specific task 84, and has as its subject 86 the delegatee 12. From the attributes of a task defined above, this indicates that the delegated task 80 is to be performed by the delegatee 12 and that the task to be performed is the task 84.

Once the delegated task 80 is revoked by the delegator, a revoked task 86 is produced. This revoked task 86 may be evidence 88 of the task revocation. The evidence 88 may be directly associated with the task 84, indicating that this task 84 has been revoked. The evidence 88 may be presented to the delegator 10 and may form the basis of subsequent delegation by the delegator 10 or performance of the task by the delegator 10. The evidence 88 ensures that the delegator 10 is in a position to perform his obligation of making sure that the delegated task 80 is facilitated and distributed appropriately.

FIG. 6 is a block diagram showing the data structure for task data, delegation module data, revocation module task data, and review module task data, as used in an example embodiment of the present invention.

Delegation module data (delegation data) 104 further includes information identifying a delegate, who takes over the responsibility to perform the task. The delegation data 104 also includes delegation identification data (stored under the task data) and delegation details, such as the date and time when the task was delegated. A delegation ID may also be assigned to each delegation instance.

General task data 106 of the task includes task identification data (e.g., the name or ID of the task) and a task description (e.g., the set of instructions to be completed to perform the task). The general task data 106 further includes data identifying the subject of the task (e.g., the principal that has to perform the task), and data identifying the target of the task. As mentioned above, the target of the task may be the business object or resources on which the set of actions defined by the task is to be performed.

Further information included in the general task data 106 may be the start date, due date and owner of the task. As will be explained later, the general task data 106 also includes delegation data identification information that is used to link possible future delegations and the respective data of such delegations to the task. Review task data identification information and/or revocation task data identification information may also be included in the general task data 106, similarly to link associated review and/or revocation task data to the task.

The specific task data 108 of the task includes task identification data (e.g., the name of the task) and a task description (e.g., the set of instructions to be completed to perform the task). The specific task data 108 further includes data identifying the subject of the task (e.g., the principal that has to perform the task), and data identifying the target of the task. As mentioned above, the target of the task may be the business object or resources on which the set of actions defined by the task is to be performed.

Further information included in the specific task data 108 may be the start date, due date and owner of the task. As will be explained later, the specific task data 108 also includes delegation data identification information that is used to link possible future delegations and the respective data of such delegations to the task. Review and/or revocation task data identification information is also included in the specific task data 108, similarly to link associated review and/or revocation task data to the task.

Revocation module task data (revocation task data) 110 may be created on the creation of the revocation task and includes, as shown in and described with respect to FIG. 6, revocation identification information which is also stored under the task data to directly link the particular revocation task with the task. The revocation module task data 110 defines parameters for revoking the task. The revocation module task data 110 further includes data relating to a duration or timeframe for completing the revocation task.

Review module task data (Review Data) 112 is created on the creation of the review task and includes, as shown in and described with respect to FIG. 6, review identification information which is also stored under the task data to directly link the particular review task with the task. The review data 112 defines parameters for reviewing the task (e.g., the evidence that should be presented to the delegator). The review data 112 further includes data relating to a timeframe for completing the review task.

Figure 7:
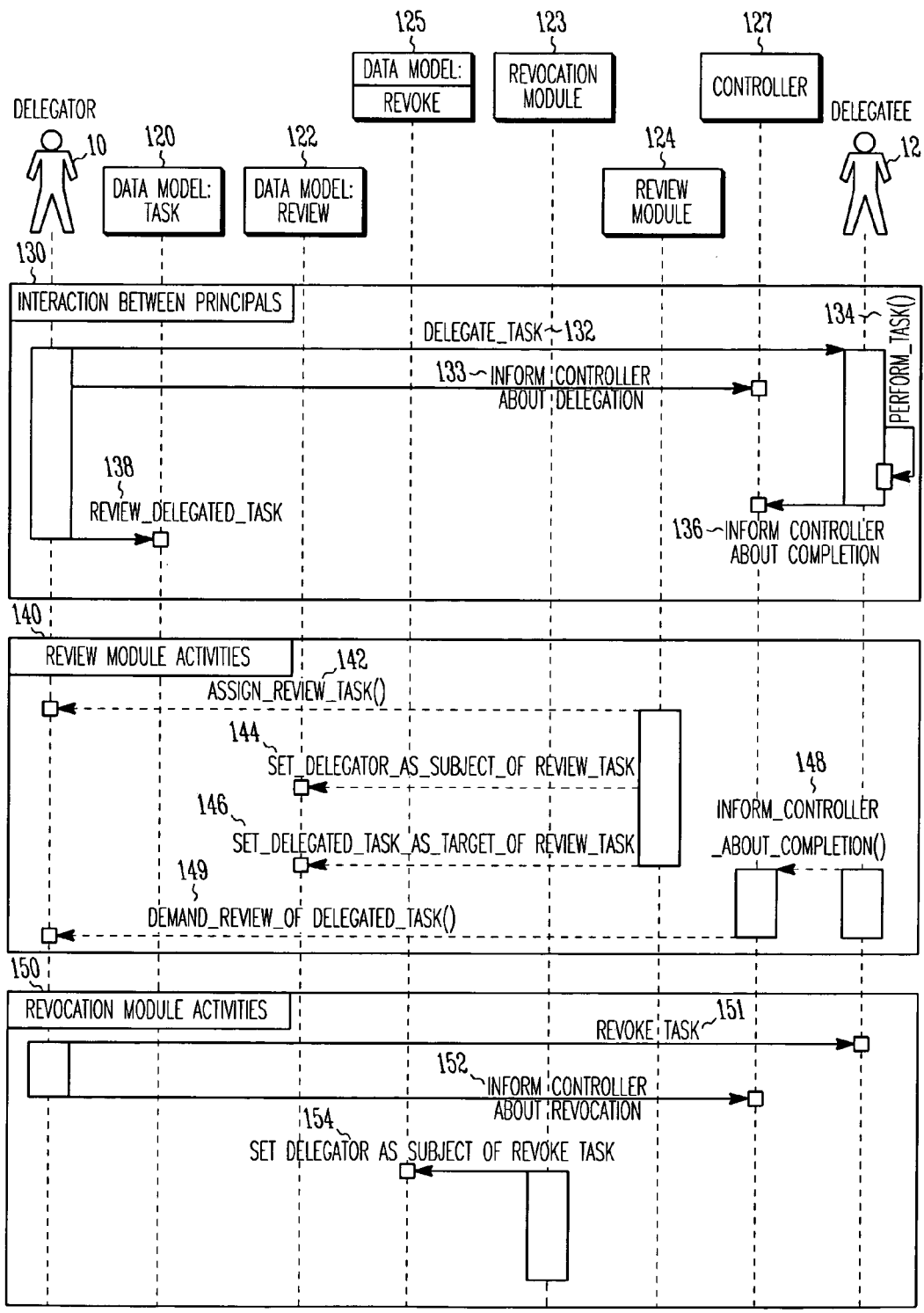
FIG. 7 is a sequence diagram showing the interaction between the delegator and delegatee, different data models, a review module, and a revocation module, according to an embodiment of the present invention.

FIG. 7 is a sequence diagram showing the interaction between the delegator and delegatee, different data models, a review module, and a revocation module, according to an embodiment of the present invention.

Turning now to FIG. 7, a sequence diagram illustrates an operational sequence, according to one example of the present invention. This sequence diagram shows the interaction between a delegator 10, a delegatee 12, a data model for the task 120, a data model for the review task 122, a revocation module 123, a review module 124, a data model for the revoke task 125, and a controller 127. The interactions are shown as interaction between the principals 130, review module activities 140 and revocation module activities 150. The delegating principal (delegator 10) delegates 132 a task to the delegatee 12. The delegatee may perform 134 the task or the delegating principal may revoke 151 the task before completion as described further with regard to FIG. 7.

The interaction between the principals 130 commences with the delegator 10 delegating 132 a task, now the delegated task, to a delegatee 12. After the delegatee 12 has performed 134 the delegated task, the delegator 10 may review 138 the completed task, i.e. the delegated task.

The review module activities 140 commence with a review task being assigned 142 by the review module 124. During this assignment, the review module 124 sets 144 the delegator 10 as the subject of the review task and further sets 146 the delegated task as the target of the review task. Once the delegated task has been completed by the delegatee, the controller 127 is informed of the completion 148. The controller 127 then demands 149 that the review task assigned to the delegator is performed 138 by the delegator 10.

Again, it will be appreciated that a delegated task may be delegated, by a delegatee, to further or subsequent delegatees. An example of a further delegation includes an incoming customer query to be resolved by a consultant A. In the circumstances, consultant A may not have the required technical knowledge to effectively deal with the query (or portion of the query), and he therefore delegates the task (or a portion of the task) to a further consultant B. This further consultant B may in turn also not be able to resolve the query and delegates the task further to consultant C. In the present example, two review relationships (and review tasks) are created, the first between consultant A and B, and the second between consultant B and C. The review tasks again seek to provide accountability in the process of delegation, even where tasks are further delegated.

It will be understood that all delegations, but in particular subsequent delegations, may be enforced according to a set of rules that may either allow or reject a subsequent delegation. The rules typically depend on the organisational context of the delegation Examples of rules are discussed herein.

The revocation module activities 150 commence with a task being revoked 151 by the delegator 10. The controller is informed 152 about the revocation. During this process, the revocation module 123 verifies 154 that the revocation of the delegated task was assigned by the delegator 10. The interaction between the respective data models and other modules form part of a system, which is described in further detail below with reference to FIG. 8.

Figure 8:
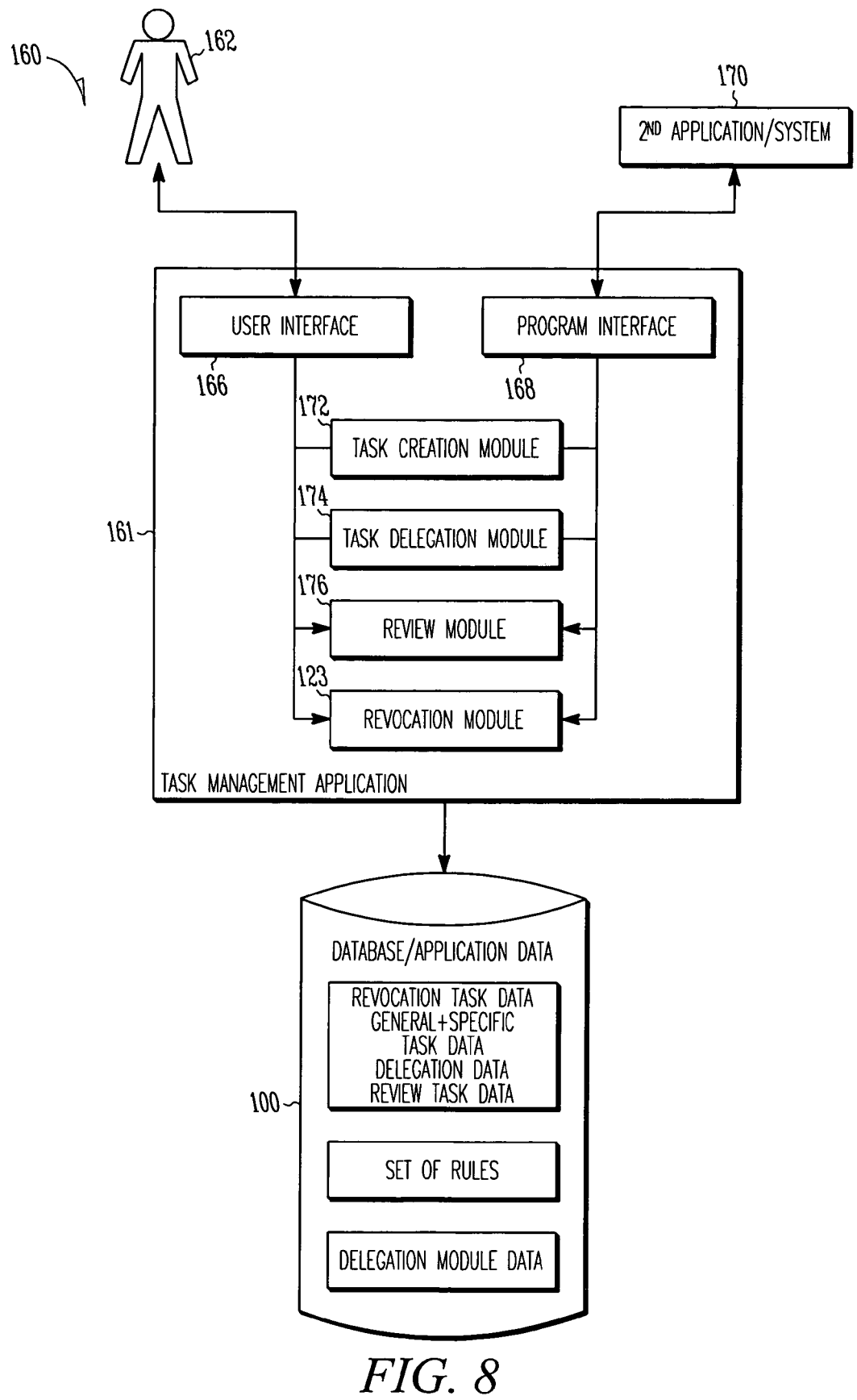
FIG. 8 is a block diagram showing a system to create a review task and a revocation task, according to an example embodiment of the present invention.

FIG. 8 is a block diagram showing a system 160 to create a review task and a revocation task, according to an example embodiment of the present invention. This system 160 comprises a task management application 161 and a database 100, the database 100 containing data relating to the task 106 and/or 108, data relating to delegation of the task 104, data relating to the revocation task 110, and review data 112.

The task management application 161 has a user interface 166 that may be used by a principal 162 to input data for use by the task management application 161. For example, the delegator may use the user interface 166 to input task data relating to a task to be performed. The user interface 166 may further be used by the delegatee to complete the task or may be used by the delegator to complete the review task.

A program interface 168 also forms part of the task management application 161 and is used to connect the task management application 161 to a second application or system 170. The task management application 161 may either be interfaced to a second application or system, or may alternatively form a part of Enterprise Resource Planning software, such as SAP or other applications.

A task creation module 172 of the task management application 161 receives the task data relating to a task to be performed and creates a task based on the received information. The task may be general or specific.

The task management application 161 may also receive (or generate) data relating to the delegation of the task. This data may be received via the user interface 166, in which case the user interface 166 is used by the delegator to identify him- or herself as the delegator of the task and also to identify a delegatee to perform the task. In this example the delegator commissions an ad hoc delegation task Alternatively, delegation data may be received via the task delegation module 174, which receives delegation data identifying a delegator and a delegatee to perform the task. This information is received from the database 100 in which delegation module data are stored. As mentioned, the task delegation module 174 is used where a particular rule determines that a task should automatically be delegated to a delegatee. Automatic delegation rules ensure that tasks are completed without delay.

The task management application 161 further includes a review module 176 that creates a review task with at least aspects of the task being the object of the review task.

The task management application 161 further includes the revocation module 123, which sets the delegator as the subject of the revoke task.

As mentioned, the system 160 further includes the database 100. The database 100 stores the task data, delegation task data, revocation task data, and review task data. The database 100 is also used to store the set of rules that govern delegations, and in particular, subsequent delegations. Task modulation data is also stored in the database.

The data stored in the database is used whenever information is required regarding details such as the person responsible for currently performing a task; the origin and ownership of the initial task and the delegation sequence of the task. Such information may be presented in the form of a task report, which contains information on the task, delegators and delegatees, evidence on the completion of tasks, and other delegation information.

It may be appreciated that the role-based Enterprise Resource Planning workflow system described herein distinguishes between general and specific tasks, and their relationship to business roles. A task revocation algorithm is generated according to the general and specific tasks, as described herein. This workflow system may be changed at runtime through the delegation and revocation of general tasks, thus supporting organizational change without stopping the system and/or without having an administrator revoke the task or delegate. The delegation and revocation of tasks may be performed on the basis of a defined delegation and revocation protocol, and supporting delegation and revocation engine (such as the delegation module and the revocation module).

Figure 9:
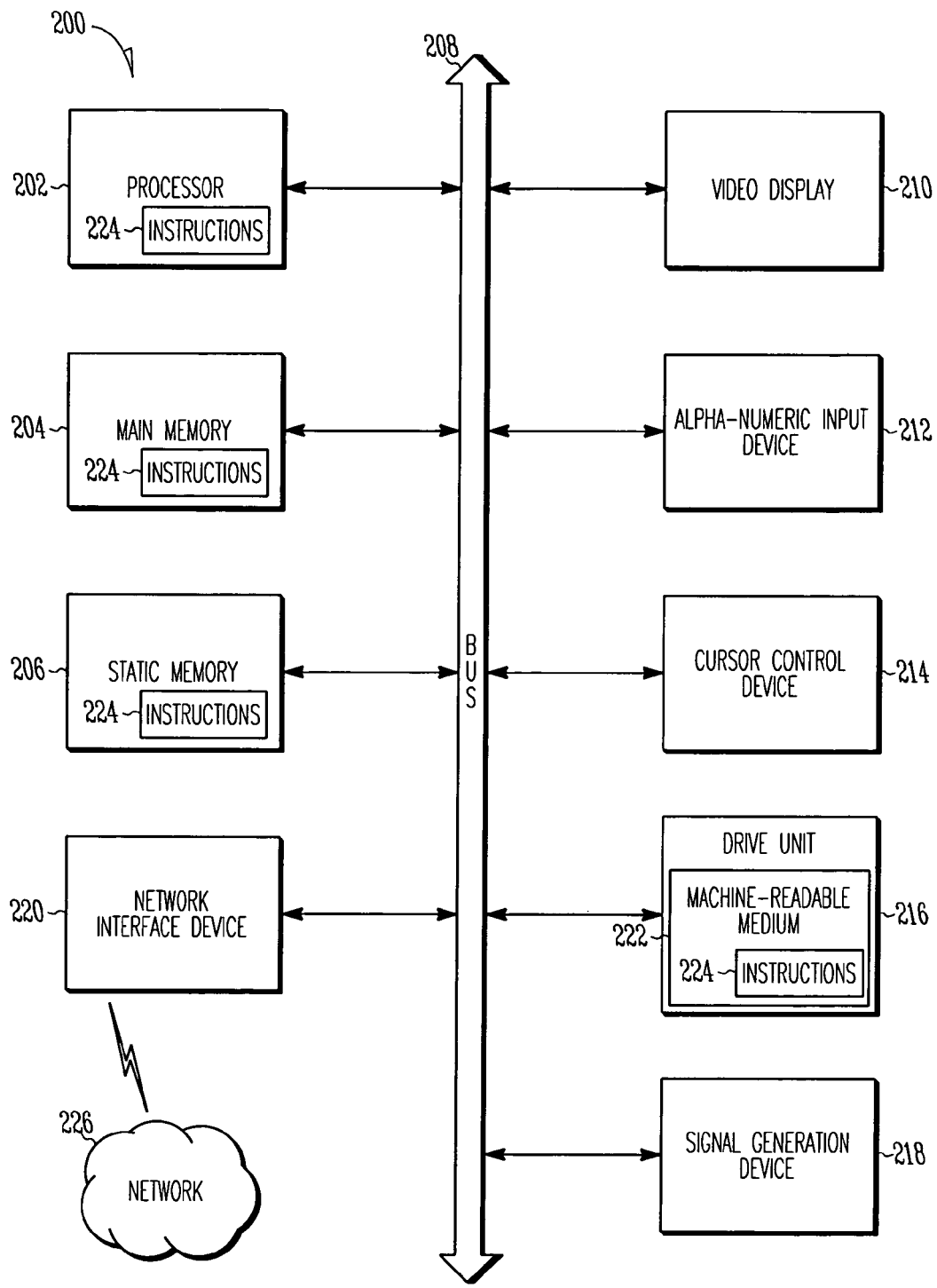
FIG. 9 shows a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method to revoke a task in a workflow system, the method comprising:
receiving task data, the task data including information regarding a task having multiple portions to be performed;
receiving delegation data, the delegation data including information identifying a delegator of the task, the task, being subsequently delegated, further including information identifying a delegatee to perform the multiple portions of the task, and, additionally, a delegatee to perform reassigned ones of the multiple portions of the task based on a determination that portions of the task are to be reassigned;
receiving revocation task data, with the revocation task data being directed to revoking the reassigned ones of the multiple portions of the task;
subsequently reassigning the reassigned ones of the multiple portions of the task after receiving the revocation task data;
using at least one processor, verifying the revocation task data is associated with the delegator of the task; and
storing the revocation task data in a database.

2. The method of claim 1, wherein the received delegation data is received from at least one of a group including a user input device and a delegation module.

3. The method of claim 1, wherein the received revocation task data is received from at least one of a group including a user input device and a revocation module.

4. The method of claim 1, wherein the task data includes information regarding a general task including at least one specific task.

5. The method of claim 1, wherein the task data includes information regarding a specific task instance of a general task.

6. The method of claim 1, further comprising revoking the task data when the revocation task data is associated with the delegator of the task.

7. The method of claim 1, further comprising aborting revocation of the task data when the revocation task data is not associated with the delegator of the task.

8. The method of claim 1, further comprising determining whether the task is completed.

9. The method of claim 1, further comprising determining a task type, wherein the task type is selected from a group including a general task and a specific task instance of the general task.

10. The method of claim 9, wherein the task type includes the general task, the method further comprising determining disposition of pending specific tasks of the general task, wherein the disposition is selected from a group including revocation and performance completion.

11. The method of claim 1, further comprising determining a principal type associated with the delegatee, wherein the principal type is selected from a: group including a business role principal and a particular principal.

12. The method of claim 1, further comprising comparing information in the subsequently delegated task to a set of rules, thereby to determine whether a subsequent delegation is allowable.

13. A machine-readable medium that is not a transitory, propagating signal storing a sequence of instructions that, when executed by one or more processors, cause the one or more processors to perform a method comprising:

receiving delegation data, the delegation data including information identifying a delegator of the task, the task, being subsequently delegated, further including information identifying a delegatee to perform the multiple portions of the task, and, additionally, a delegatee to perform reassigned ones of the multiple portions of the task based on a determination that portions of the task are to be reassigned;

receiving revocation task data, with the revocation task data being directed to revoking the reassigned ones of the multiple portions of the task;

subsequently reassigning the reassigned ones of the multiple portions of the task after receiving the revocation task data;

verifying the revocation task data is associated with the delegator of the task; and storing the revocation task data in a database.

* * * * *